United States Patent Office 2,898,277
Patented Aug. 4, 1959

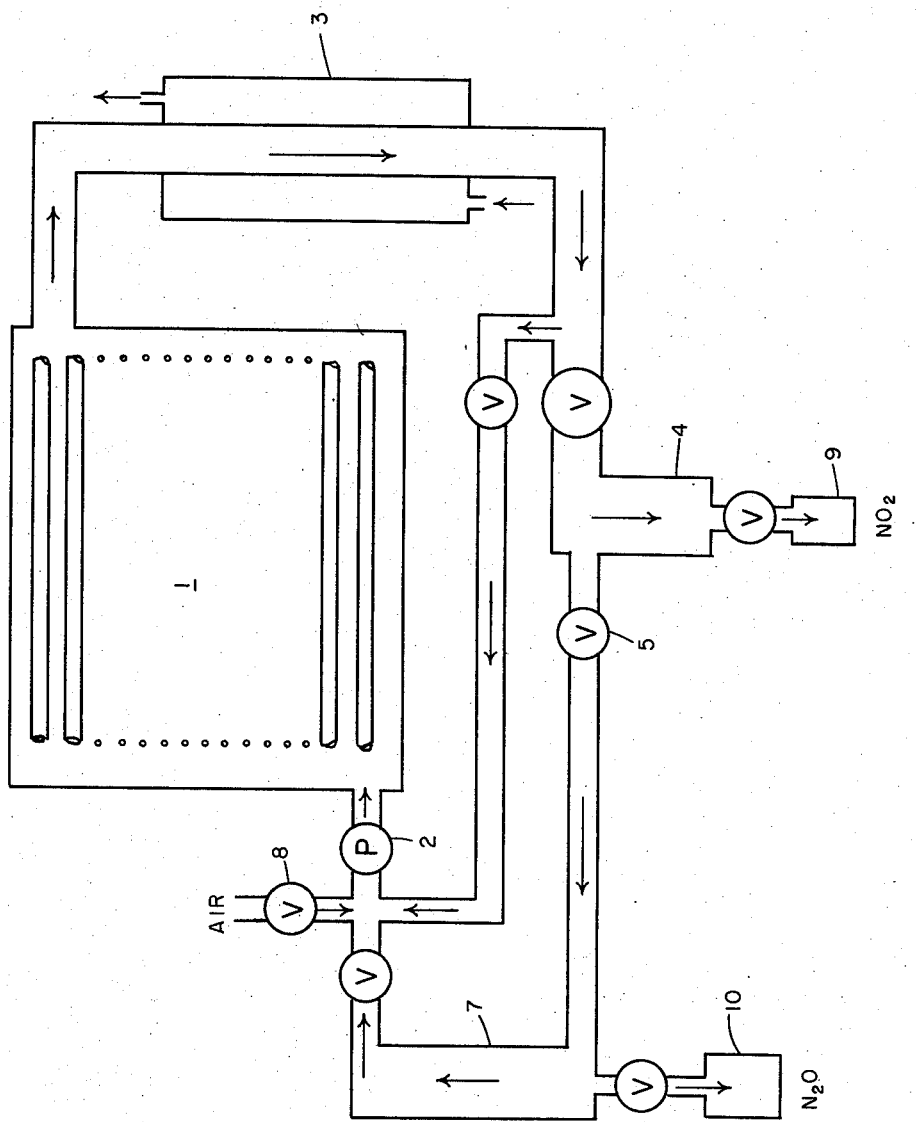

2,898,277

METHOD OF FIXING NITROGEN FOR PRODUCING OXIDES OF NITROGEN

Paul Harteck and Seymour Dondes, Troy, N.Y., assignors, by mesne assignments, to the United States of America as represented by the United States Atomic Energy Commission Application March 6, 1956, Serial No. 570,651

4 Claims. (Cl. 204—154)

This invention relates to the production of nitrogen dioxide and nitrous oxide and more particularly to a method of fixing nitrogen by the action of ionizing radiation on air and other nitrogen and oxygen mixtures at pressures higher than atmospheric and temperatures higher than room temperature.

The method of fixing nitrogen from air and nitrogen and oxygen mixtures is well known, and various modes have been used to carry out this reaction. Since the inception of nuclear reactors, the economics of the fixation of nitrogen to produce nitrogen dioxide through nuclear energy has not been undertaken. The only data to date is the work of W. Primak and L. H. Fuchs published in Nucleonics, 13, 3, 39 (1955). They studied how nitrogen and oxygen react to coat nitric acid susceptible metals in the presence of water vapor in Argonne's CP-3 heavy water reactor by determining the reaction product formed on nickel. Irradiation temperature was about 40° and a total of one atmosphere pressure was used (including the partial pressure of the water vapor). Earlier similar studies of nitrogen fixation in a reactor showed that the nitrogen and oxygen combined in the gas phase (S. Gordon and A. O. Allen, CC-3412).

One of the objects of this invention is to provide an economic method for producing nitrogen dioxide and nitrous oxide by subjecting air to the ionizing radiation of a reactor at elevated temperatures and pressures. Another object is to remove the nitrogen dioxide which is formed during the process as a liquid by cooling, or as nitric acid by the addition of water. Another object is the utilization of the air as a transfer medium for the removal of heat from the reactor to a unit using this heat, at the same time that the air undergoes reaction. The heat thus removed may be used for steam generation, or other purposes as desired. A further object is to recycle the unreacted nitrogen and oxygen from air, after removal of the nitrogen dioxide, and possibly nitrous oxide. Other objects will appear hereinafter.

These objects are accomplished in the manner described below, and illustrated in the accompanying drawing in which the figure is a schematic showing of a reactor and the elements associated therewith which may be used for producing nitrogen dioxide and nitrous oxide from air.

Referring to the single figure, 1 is a nuclear reactor containing enriched uranium or plutonium (in a fine dispersion), and parts of their fission products. Control rods (not shown) are so placed that when inserted, they prevent the reactor from exceeding the critical conditions. A pump 2 forces air into the reactor at pressures above atmospheric pressure. The gas containing the reactants and the products may flow from the reactor into a steam generator 3 and then into a cooling tower 4, or if recovery of heat is not a consideration, directly into the cooling tower where the nitrogen dioxide condenses as a liquid. Boiling point at atmospheric pressure for nitrogen dioxide (nitrogen tetroxide) is 21° C. By a suitable process nitrogen tetroxide may be directly converted into nitric acid. From the cooling tower, the nitrogen dioxide is conveyed for storage 9, or other use. The residual air from the cooling tower is passed to valve 5 which permits the air to go through compression 7 and greater cooling for the removal of nitrous oxide 10, if desired. The residual air from the cooling towers is then passed back into pump 2 for reinsertion into the reactor. Additional air or oxygen is fed into the system as required through valve 8. Shielding and control rods are not shown in connection with the pile, but it is to be understood that the reactor is enclosed in the usual shielding and that control rods may be used. For reasons to be discussed later the unreacted nitrogen and oxygen of the air mixture should be removed from the system periodically.

The formation of nitrogen dioxide and nitrous oxide from air or other nitrogen and oxygen mixtures may be expressed as follows:

(1) $N_2 \longrightarrow\hspace{-1em}\sim\hspace{-1em}\longrightarrow$
 (a) $N_2^+ + e^-$
 (b) $N_2^*$
 (c) $N_2^* = N + N$ or $N_2^+ + e^- = 2N$ (2) $O_2 \longrightarrow\hspace{-1em}\sim\hspace{-1em}\longrightarrow$
 (a) $O_2^+ + e^-$
 (b) $O_2^*$
 (c) $O_2^* = O + O$ (3) $N + O_2 \rightarrow NO + O$
(4) $O + O_2 \rightleftarrows O_3$
(5) $NO_2 + O \rightarrow NO + O_2$
(6) $2NO + O_2 \rightarrow 2NO_2$
(7) $2NO_2 \rightleftarrows N_2O_4$

*Back reactions*

(8) $NO_2 \longrightarrow\hspace{-1em}\sim\hspace{-1em}\longrightarrow$
 (a) $NO_2^+ + e^-$
 (b) $NO + O$
 (c) $N + O + O$ (9) $NO_2 + N \rightarrow$
 (a) $2NO$
 (b) $N_2O + O$
 (c) $N_2 + 2O$

(10) $NO + N \rightarrow N_2 + O$

(11) $N_2O \longrightarrow\hspace{-1em}\sim\hspace{-1em}\longrightarrow$
 (a) $N_2O^+ + e^-$
 (b) $N_2 + O$
 (c) $N + NO$

(12) $2O_3 \rightarrow 3O_2$

The ozone plays no major role in this system.

In passing through the reactor, the nitrogen and oxygen of the air become ionized and decomposed by the fission fragments, by the beta and gamma rays and by fast neutrons into nitrogen and oxygen atoms as in reactions (1c) and (2c). This nitrogen atom react with molecular oxygen or $NO_2$ to form nitric oxide and atomic oxygen as in reaction (3) or (9a). Nitrogen dioxide is formed predominantly through reaction (6). Nitrous oxide is formed according to reaction (9b). Reactions (3) and (9a) are the important reactions as the first steps in the fixation of nitrogen. Reaction (10) is to be avoided as far as possible since this reaction tends to consume one fixed nitrogen-atom (in the nitric oxide) and one free nitrogen-atom with the formation of molecular nitrogen. Although theoretically a very high intensity of ionizing radiation is not favorable to the efficiency of the nitrogen dioxide formation, it must be used for adequate production of the oxides of nitrogen. A high pressure is favorable for the oxide production since reaction (6) is a reaction of the third order forming nitrogen dioxide. The nitrogen thus fixed in the nitrogen dioxide is more stable to ionizing radiation than nitric oxide. A temperature above 100° C. in the reaction zone is also favorable since reaction (3) seems to have a larger heat of activation than reaction (10). It should be noted that nitric oxide, due to its low ionization potential, forms positive ions easily. These ions, when neutralized by negative charges, decompose into nitrogen and oxygen atoms.

In air, the gas most abundant other than nitrogen and oxygen (disregarding moisture), is argon (1%). To determine the effect of argon on the fixation of nitrogen, an investigation was undertaken which revealed that argon decreases the yield in the nitrogen oxides formed. Therefore, it is not advisable to take air and add oxygen to consume the total nitrogen, since this will enrich the total argon concentration. Thus, care must be given to this effect. Also, the argon of the air becomes radioactive in the process of irradiation. The normal precautions as used with present day air-cooled piles must be applied. A brief estimate of the economics, comparing the cost of the fuel (uranium-235) to the cost of the product (nitric acid) is as follows: One mole of uranium-235, is worth about $6000 ($25 per gram as published price). The kinetic energy of the fission products from uranium-235 is $160 \times 10^6$ electron volts. From our experimental results, up to $100 \times 10^6$ electron volts was absorbed in the gas with the remainder in the solids. The G value for the nitrogen fixation depends on operating conditions and was found experimentally under optimum conditions to be 6. The G value of 6 signified that, of the nitrogen atoms formed per 100 electron volts, 6 produced nitrogen dioxide. Therefore, $6 \times 10^6$ moles of nitrogen dioxide were formed from one mole of uranium-235. With the formula weight of commercial 38° Baumé nitric acid about 80, and the present day price of about $125 per ton, $6 \times 10^6$ moles of nitrogen dioxide produced about $4.8 \times 10^8$ grams of nitric acid or about 480 tons, which have a present day value of $60,000. Thus, the value of the product was roughly ten times the value of the fuel. In this price estimate, the value of the heat to be used for steam generation, was disregarded, as was the value of the nitrous oxide produced. These two items tended to increase the value of the process. On the other hand, minor items of expenditure were required for the purification of the products from radioactive contaminants, which was readily accomplished by distilling the nitrogen dioxide, the nitric acid or the nitrous oxide. The cost of fuel reprocessing was roughly equal to the value of the power produced by steam generation.

In experimental work leading up to the development of the present invention, investigation was made of the radiation effects on mixtures of nitrogen and oxygen containing from 1% or N and 99% of O to 99% of N and 1% of O. In these experiments pressures were varied from 0.01 to 50 atmospheres; temperatures were varied from $-193°$ C. to 300° C., and radiation intensities from $5 \times 10^6$ R/hr. to $3 \times 10^8$ R/hr. Fortunately it was found that the nitrogen/oxygen ratio in normal air gave the best yields of nitrogen oxides. Experiments with relative oxygen concentrations both above and below that of normal air produced reduced yields. It was found best to maintain a pressure of more than 10 atmospheres during radiation, and best yields of nitrogen oxides were obtained when normal air was irradiated at a pressure of about 20 to 25 atmospheres. A temperature between 175° C. and 225° C. promotes better yields. The G value (number of molecules formed per 100 electron volts) obtained for nitrogen dioxide was 4 to 5 under favorable conditions and reaches 6 under optimum conditions. The G value for nitrous oxide was 2 to 2.5 under favorable conditions and reaches 3 under optimum conditions.

In a typical experiment, a 100 cc. quartz vessel containing dry air at 25 atmospheres pressure was irradiated in the Brookhaven Pile at about 200° C. After irradiation, the nitrogen dioxide was condensed in a sealed vessel by dipping it in cool water so that the liquid nitrogen tetroxide could be readily observed as a few tenths of a cubic centimeter indicating about ½ of the oxygen of the air had been consumed to form nitrogen tetroxide. This did not include the amount of nitrous oxide formed, which utilized almost the remainder of the oxygen of the air.

While the invention has been described in its preferred embodiment, it is to be understood that the words used are words of description rather than of limitation and that changes, within the purview of the appended claims, may be made without departing from the true scope and spirit of the invention in its broader aspects.

What we claim is:

1. In the method of producing oxides of nitrogen the steps in combination comprising irradiating air at high pressure in a nuclear reactor, cooling to remove $NO_2$, compressing the cooled gas, further cooling to remove $N_2O$ and recirculating the cooled compressed air to the reactor and further irradiating it therein.

2. The method of claim 1 wherein power is derived from the initial cooling of the irradiated air.

3. The method of claim 1 wherein oxygen is added to the compressed cooled gas to re-establish its composition to that of air before recirculation into the reactor.

4. The method of producing nitrogen dioxide which comprises compressing the air to an elevated pressure of about 20 to 25 atmospheres, subjecting the compressed air to ionizing radiation at an elevated temperature from about 175° C. to 225° C., and thereafter separating the nitrogen dioxide formed by said irradiation from the other products formed thereby.

References Cited in the file of this patent

UNITED STATES PATENTS

| 2,485,478 | Cotton | Oct. 18, 1949 |
| 2,708,656 | Fermi et al. | May 17, 1955 |
| 2,809,831 | Daniels | Oct. 15, 1957 |

FOREIGN PATENTS

| 309,001 | Great Britain | Apr. 2, 1929 |

OTHER REFERENCES

Nucleonics, May 1955, pp. 38–41.